June 21, 1932. D. G. JACK 1,864,021
APPARATUS FOR EVAPORATING AND DISTILLING LIQUIDS
Filed July 22, 1930
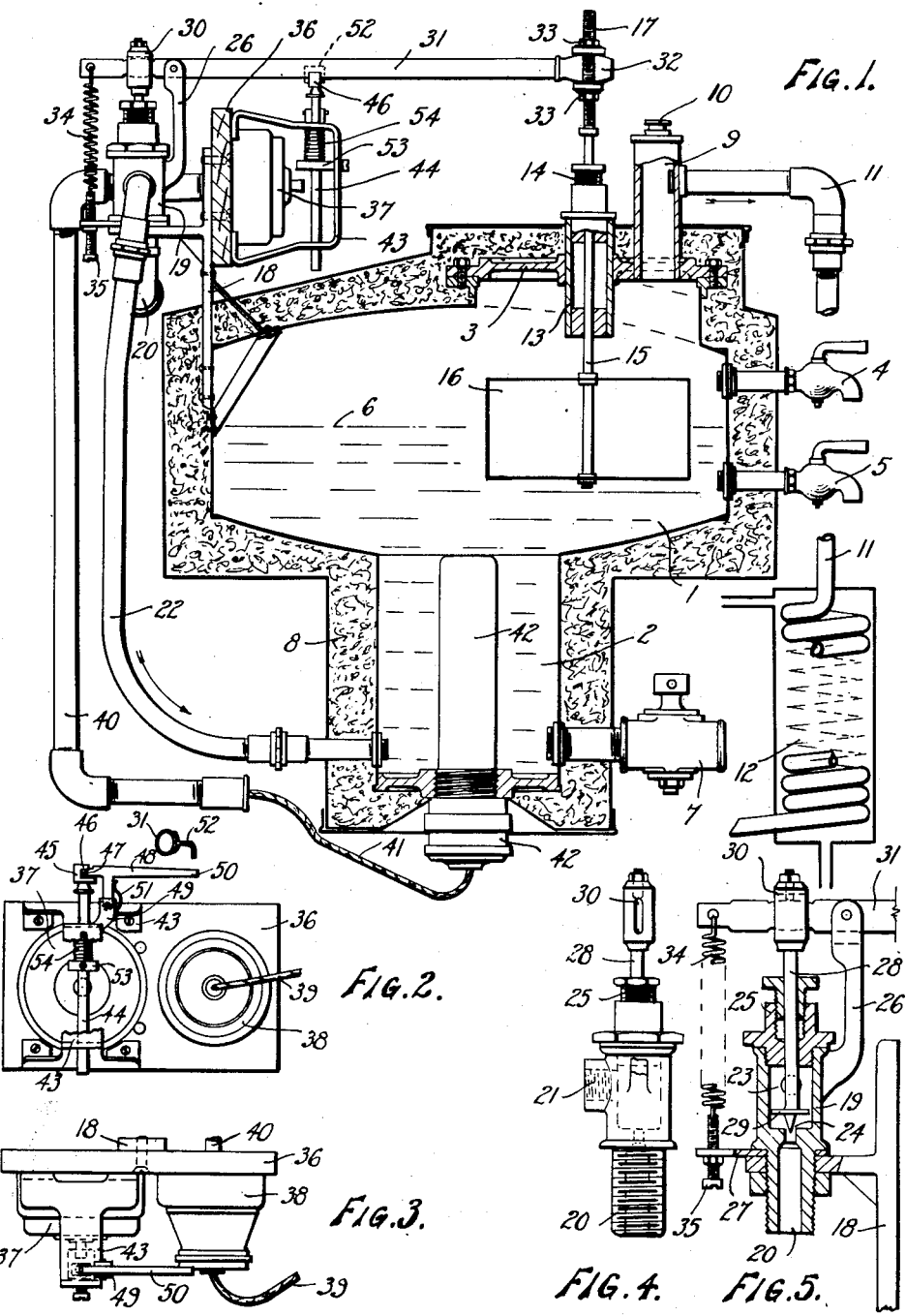
Inventor:-
Douglas Gordon Jack
by Langner, Parry, Card & Langner
Attys.

Patented June 21, 1932

1,864,021

UNITED STATES PATENT OFFICE

DOUGLAS GORDON JACK, OF AUCKLAND, NEW ZEALAND

APPARATUS FOR EVAPORATING AND DISTILLING LIQUIDS

Application filed July 22, 1930, Serial No. 469,843, and in New Zealand February 21, 1930.

This invention relates to apparatus for evaporating and distilling liquids, the objects of the invention being the provision of an improved evaporating and distilling apparatus which in use will automatically maintain a feed of the requisite quantity of liquid for evaporating purposes, will automatically switch off the heating medium if the supply of liquid for evaporating purposes should fail and will be a compact, self-contained and readily installed piece of apparatus, substantially automatic in operation.

Broadly the invention comprises an enclosed container for holding the liquid to be evaporated, an electric heating medium in said container for evaporating said liquid, vapour outlet means passing from said container to vapour condensing or distilling means, float means in said container with mechanism for maintaining the liquid level in said container substantially constant, and means for breaking the electric circuit of the heating medium if said constant fluid level in said container should fail to be maintained.

In describing a constructional embodiment of the invention, reference will be made to the accompanying drawing in which Figure 1 shows a sectional elevation of the apparatus, Figure 2 shows a front elevation of the switch trip mechanism with the cage partly broken away, Figure 3 is a longitudinal section through the trip mechanism of Fig. 2, Figure 4 shows the liquid feed valve with supporting bracket broken away, and Figure 5 is a sectional side view thereof.

The new apparatus comprises a preferably cylindrical airtight container 1 which may have its lower portion 2 reduced in size.

It is to be understood that it is not essential for the effective operation of the apparatus to have the lower reduced portion 2, this latter only being expedient when the capacity of the container must be so low as to not come under the customs regulations for distilling apparatus.

The container 1 is provided with an upper removable inspection cover 3, a pair of test cocks 4 and 5 situated above and below the normal level of liquid 6 in said container 1 and a lower drain cock 7, said container 1 also being covered by a suitable heat insulating material 8.

Fitted to the inspection cover 3 there is a vapour outlet fitting 9 surmounted by a relief or safety valve 10, suitable pipe connections 11 leading from the fitting 9 to a condenser 12 of any suitable known type such as a spiral pipe coil surrounded by circulating cooling water (as shown) or an annular or like atmospheric cooled condenser.

Fitting preferably centrally into the inspection cover 3 there is a float rod guide 13 with upper gland 14 through which passes the float rod 15 which has secured at its lower end within container 1 the float 16 and has a threaded upper end 17.

A bracket 18 preferably secured near the top of the container 1 carries the switching mechanism (see Figures 2 and 3) and the liquid feed control mechanism (see Figures 4 and 5).

The liquid feed mechanism comprises a body member 19 with lower inlet connection 20 and right angle outlet connection 21, the said inlet connection 20 being connected (preferably through a suitable non-return valve not shown) to a liquid supply pipe, and the outlet connection 21 connected by feed pipe 22 to preferably near the bottom of container 1.

The body member 19 has also a central bore 23, valve seating 24, a gland 25, a control lever supporting bracket 26, and tension screw bracket 27, a needle valve 28 with lower flange 29 and an upper slotted top 30 being adapted to fit into the body member 19 through its gland 25, the flange 29 of needle valve 28 in close proximity to the walls of bore 23 enabling the said valve 28 to operate in the known "poppet valve" action.

Passing through the slotted top 30 of the needle valve 28 and pivoted on the supporting bracket 26 is the control lever 31 which extends across the top of container 1 and has a bifurcated end 32 for engaging over the threaded upper end 17 of the float rod 15, adjusting nuts 33 being fitted on said threaded upper end 17 above and below the lever end 32.

To the portion of the control lever 31 extending beyond the slotted top 30 of needle valve 28 a tension spring 34 is attached which passes down to a tension adjusting screw 35 carried by bracket 27.

The switching mechanism (see Figures 1, 2 and 3) comprises a base board 36 secured to the bracket 18 and on the said board 36 there is mounted a suitable electric switch 37 and an electric power connecting receptacle 38 to which the power supply wires 39 pass, conduit pipes 40 conveying the wires 41 to the electric heating unit 42 which is removably screwed into or near the bottom of container 1.

It will be readily understood that in larger sized apparatus there may be several electric heating units 42 and not one only as shown, and said units may project horizontally into container 1.

With larger apparatus calling for greater eilectric power consumption a switch capable of taking the greater electric current will be applied in place of the simple tumbler switch 37 shown, without departing from the broad idea of the invention.

Secured to the board 36 over the switch 37 there is a tripper cage 43 in which a tripper rod 44 is adapted to move vertically, said rod 44 being surmounted by the tripper 45 (see Figure 2) below the stop portion 46 of which the engaging end 47 of a tripper lever 48 is adapted to engage, the said tripper lever 48 being pivotally mounted to an extension 49 of cage 43 and having an extended tripper arm 50.

A round or strip spring 51 secured to the cage 43 and pressing against the tripper lever 48 tends to keep the engaging end 47 of the latter below the tripper stop portion 46.

The control lever 31 is adapted to pass at right angles over the top of the tripper arm 50, a tappet 52 secured to the lever 31 (see Figure 2) projecting to a point directly above the end of said tripper arm 50.

The tripper rod 44 has a tripping block 53 mounted thereon, a compression spring 54 over the rod 44 and between the block 53 and the upper portion of the cage 43 tending to force the rod 44 to a downward position wherein the block 53 would engage the switch 37.

In operation, considering water as being the liquid it is desired to distill, the inlet connection 20 will be connected to a water main or suitable supply cistern having sufficient head and water will flow in to container 1 until it reaches the normal level 6 at which point the float 16 will have moved the rod 15 and the control lever 31 so that needle valve 28 rests on its seat 24 and the flow of water to the container 1 ceases.

The upward movement of that portion of the control lever 31 between its pivot on bracket 26 and the float spindle 15 has caused the tappet 52 attached to said control lever 31 to move upwardly clear of the tripper arm 50.

This enables the tripper rod 44 to be manually moved upwardly when the engaging end 47 of tripper lever 48 will automatically move due to strip spring 51 into engagement with the stop portion 46 so that the tripper rod 44 is held in the upward position as shown in Figure 2.

The securing of the tripper rod 44 in the upward position has caused its tripping block 53 to be also moved upwardly clear of switch 37.

This switch 37 is so mounted on the base board 36 as to be (contrary to usual practice with tumbler switches) "on" when in the up position and "off" when in the down position, therefore, as the tripping block 53 has been moved upwardly, the switch 37 can also be moved upwardly, permitting the electric current to flow from the power supply wires 39 and wires 41 to the electric heating unit 42.

The heating unit 42 heats and evaporates the water in container 1 the vapours passing through fitting 9 and pipes 11 to the condenser 12 wherein they are condensed and the distilled water delivered and collected in a known manner, the relief or safety valve 10 permitting relief of excess pressure of vapour in container 1, if there should be such excess due to unforseen circumstances.

Under normal conditions, the apparatus will continue to work indefinitely, the float 16 rising and falling and thereby opening and closing the needle valve 28 so that the water level 6 is maintained constant, but if due to unforseen circumstances the water supply should fail, the water in the container 1 would evaporate and the water level 6 fall until the float 16 descends to the stage when the tappet 52 of the control lever 31 encounters the tripper arm 50.

The tripper arm 50 would then be moved radially downwardly and thus cause the engaging end 47 to move clear of the stop portion 46 of the tripper rod 44 so that the spring 54 would force the latter down and in doing so, the tripping block 53 would engage switch 37 and move same to the "off" position.

Thus, as further flow of current to the electric heating unit 42 would cease, the possibility of the latter getting burnt out would be prevented, and overheating and other serious trouble to the apparatus avoided.

The supply of water having again obtained and the container 1 filled to the normal level 6, the control lever 31 will again be in the raised position which will allow the tripper mechanism to be set and the switch 37 moved to the "on" position as described.

Periodically the container 1 can be washed out for the removal of accumulated sludge and deposits, by opening the drain cock 7, the test cocks 4 and 5 providing a means for checking the level 6 of the liquid in container 1, although it will be readily understood that in place of or in addition to these cocks 4 and 5 a water gauge may be provided.

The tension spring 34 with its adjustment screw 35 provides means for counterbalancing the suspended weight of the control lever 31, the adjustment nuts 33 on the threaded upper end 17 of float rod 15 enabling the float 16 to be adjusted to keep the fluid level 6 at a desired position.

I claim:

1. In an improved apparatus for evaporating and distilling liquids comprising an airtight container, means for admitting liquid and maintaining same at a substantially constant level in said container, electric heating means for evaporating the liquid in said container, an outlet from said container for conveying the vapours to a condenser; means for breaking the flow of electric current to said heating means if the liquid in said container should substantially fall below said constant level breaking means comprising a switch for making and breaking the electric current to said heating means, a cage over said switch carrying a tripper rod with tripper block and spring, an engaging piece at the top of said tripper rod, a pivoted tripper arm adapted to engage said engaging piece and projecting to the vicinity of a control arm having a tappet extension adapted on appropriate movement of said control arm to come into contact with said tripper arm and release the same from said engaging piece, thus releasing said spring which forces said tripper rod downwardly causing said block or tripper rod to cut off the switch.

2. An apparatus for evaporating and distilling liquids, comprising an airtight container, a float within said container having a float rod connected thereto adapted to move vertically through a gland at the top of said container, a pivoted control lever for engaging at one of its ends the said float rod and in the vicinity of its other end the top of a needle valve, having a housing with liquid inlet and outlet connections, said needle valve being adapted to lift from its seat to permit flow of liquid through said housing to the said container when said float in said container falls below normal level and to close on its seat in said housing to prevent flow of liquid therethrough when the float rises to substantially normal level, an electric heating element for evaporating the liquid in said container, an outlet from said container for conveying the vapors to a condenser, and means for breaking the flow of electric current to said heating means if the liquid in said container should substantially fall below said constant level, comprising a switch for making and breaking the electric current to said heating means, a cage over said switch carrying a tripper rod with tripper block and spring, an engaging piece at top of said tripper rod, a pivoted tripper arm adapted to engage said engaging piece and also project to the vicinity of a control arm having a tappet extension adapted on appropriate movement of said control arm to come in contact with said tripper arm and release same from said engaging piece thus releasing said spring which forces said tripper rod downwardly causing said block or tripper rod to cut off the switch.

3. An apparatus for evaporating and distilling liquids, comprising an airtight container, a float in said container, a float rod connected to said float, a gland at the top of said container through which the said rod is adapted to move vertically, a pivoted control lever engaging at one of its ends the said float rod, a needle valve with which the said control lever engages adjacent its other ends, a housing for the said needle valve having a liquid inlet and outlet, the said needle valve lifting to pass liquid to the housing to the container when the float is below its normal level, and seating on its seat when the float rises to its normal level, to prevent flow of liquid to the container, an electric heating element in the said container, and means for breaking the circuit in the said heating means as an incident to substantially fall of the liquid level in the container, the said last-mentioned means comprising a switch, a cage over said switch, a tripper rod, a tripper block and a spring on the said cage, an engaging piece at the top of said tripper rod, a pivoted tripper arm for engaging said engaging piece, the said control lever having a tappet extension into the vicinity of which the said tripper arm extends, movement of the control arm causing the tappet extension to contact with the tripper arm and release the same from the engaging piece, thus releasing the spring so that the letter forces the tripper rod downwardly, causing the block or tripper arm to throw the switch to deenergize the heating circuit.

4. In a distilling apparatus comprising an air tight container, means for controlling the supply of liquid to the said container, the said means comprising a float resting in the said container, a float rod on the said float and extending outwardly from the said container, a pivotally mounted control lever connected adjacent one end to the said float rod, a needle valve to which the said control lever is connected on the side of the pivot point opposite the said float rod, adjustable means for biasing the said control lever and for normally urging upwardly that end of the control lever secured to the float rod, a housing about the said needle valve and having a liquid inlet and a liquid outlet connected with the said container, upward movement of the float causing downward movement of the needle valve and closure of the liquid inlet, and downward movement of the float causing opening of the liquid inlet.

5. In a distilling apparatus comprising an airtight container, means for controlling the supply of liquid to the said container, the said means comprising a float resting in the said container, a float rod on the said float and extending outwardly from the said container, a pivotally mounted control lever connected adjacent one end to the said float rod, a needle valve to which the said control lever is connected on the side of the pivot point opposite the said float rod, means for adjusting the point of connection of the said valve rod with the said control lever, and an adjustable spring connected to the said control lever on the opposite side of its connection with the needle valve from the said float rod, for normally urging the said control lever and its needle valve downwardly, and a housing about said needle valve and having a liquid inlet and a liquid outlet connected with the said container, upward movement of the float causing downward movement of the needle valve and closure of the liquid inlet, and downward movement of the float causing opening of the liquid inlet.

6. In a distilling apparatus comprising an airtight container, a float in the said container, an upwardly extending float rod, a needle valve controlling the flow of liquid to the said container, and a control lever extending between the said float rod and the needle valve whereby the said float controls the said needle valve; heating means for heating the liquid in the said container, the said heating means comprising a heating unit in the said container, a switch for cutting in and out the circuit through the said heating unit, spring biased means tending to disengage the said switch after the latter has been closed, manually set means for engaging the said spring biased means to hold the same in its inoperative position, and means on the said control lever actuated as an incident to excessive lowering of the said float, to engage the said last-mentioned means to withdraw the same from contact with the spring biased means whereby the latter acts to actuate the switch, thus opening the circuit to the heating unit.

7. In a distilling apparatus comprising an airtight container, a float in the said container, an upwardly extending float rod, a needle valve controlling the flow of liquid to the said container, and a control lever extending between the said float rod and the needle valve whereby the said float controls the said needle valve; heating means for heating the liquid in the said container, the said heating means comprising a heating unit in the said container, a switch for cutting in and out the circuit through the said heating unit, a cage about the said switch, a tripper rod extending through said cage and adapted to actuate the said switch to open the circuit through the said heater unit, spring means normally urging the said rod into its switch actuating position, a tripper mounted above said rod, a pivotally mounted tripper lever adapted to engage said tripper, thereby maintaining the said rod out of its switch actuating position, resilient means for normally urging the said tripper lever into contact with the said tripper, and means on the said control lever, which, when the float is lowered beyond a predetermined point, contacts with and urges the tripper lever against the tension of said resilient means, out of contact with the said tripper, whereby the said rod is released and is urged by the said spring into its switch actuating position, whereby the circuit through the said heater unit is opened.

8. In a distilling apparatus comprising an airtight container, cooperating means for controlling the flow of liquid to the said container and the supply of heat thereto, the said cooperating means comprising a float in the said container, a float rod extending upwardly from the said container, a control lever adjustably connected at one of the said float rods, a pivot point for the said control lever, a needle valve to which the said lever is connected on the opposite side of its pivot point from the float rod, a housing for the said needle valve and having a liquid inlet and a liquid outlet connected to the said container, adjustable, resilient means for normally urging the valve on its seat in the said housing, an electrical heating unit in the said container, a switch for making and breaking the circuit through the said container, a spring biased rod normally tending to actuate the said switch to open the circuit through the heating unit, a tripper on said rod, a tripper lever normally engaging said tripper to hold the said rod in its inoperative position, and means on the said control lever for engaging said tripper lever and for actuating the same to disengage the tripper, thereby releasing the said spring biased rod, which actuates the switch to deenergize the heating circuit, upward movement of the float causing closure of the needle valve and downward movement thereof causing opening of said needle valve, excessive downward movement of the float causing actuation of the said tripper lever to disengage the said tripper.

9. In a distilling apparatus comprising an airtight container, cooperating means for controlling the flow of liquid to the said container and the supply of heat thereto, the said cooperating means comprising a float in the said container, a float rod extending upwardly from the said container, a control lever adjustably connected at one of the said float rods, a pivot point for the said control lever, a needle valve to which the said lever is connected on the opposite side of its pivot point from the float rod, a bracket connected to the said container, a housing mounted on the said bracket, for the said needle valve and having a liquid inlet and a liquid outlet therein connected with the said container, said housing having a bracket thereon containing the pivot point for the said control lever, adjustable, resilient means for normally urging the valve on its seat in the said housing, and electrical heating unit in the said container, a switch also mounted on the said first-mentioned bracket for making and breaking the circuit through the said container, a spring biased rod normally tending to actuate the said switch to open the circuit through the heating unit, a tripper on said rod, a tripper lever normally engaging said tripper to hold the said rod in its inoperative position, and means on the said control lever for engaging said tripper lever and for actuating the same to disengage the tripper, thereby releasing the said spring biased rod, which actuates the switch to deenergize the heating circuit, upward movement of the float causing closure of the needle valve and downward movement thereof causing opening of said needle valve, excessive downward movement of the float causing actuation of the said tripper lever to disengage the said tripper.

In witness whereof I affix my signature.

DOUGLAS GORDON JACK.